(12) United States Patent
Saito (10) Patent No.: US 8,194,183 B2
(45) Date of Patent: Jun. 5, 2012

(54) IMAGING DEVICE (75) Inventor: Masashi Saito, Koganei (JP)

(73) Assignee: Konica Minolta Opto, Inc., Tokyo (JP)

( * ) Notice: Subject to any disclaimer, the term of this patent is extended or adjusted under 35 U.S.C. 154(b) by 208 days.

(21) Appl. No.: 12/664,871

(22) PCT Filed: Jul. 14, 2008

(86) PCT No.: PCT/JP2008/062686
§ 371 (c)(1),
(2), (4) Date: Dec. 15, 2009

(87) PCT Pub. No.: WO2009/016949
PCT Pub. Date: Feb. 5, 2009

(65) Prior Publication Data
US 2010/0177238 A1    Jul. 15, 2010

(30) Foreign Application Priority Data
Jul. 27, 2007   (JP) ................. 2007-195682

(51) Int. Cl.
*H04N 5/225* (2006.01)

(52) U.S. Cl. ........................................ 348/374

(58) Field of Classification Search .................. 348/374; 359/684, 784
See application file for complete search history.

(56) References Cited

U.S. PATENT DOCUMENTS

| | | | | |
|---|---|---|---|---|
| 5,298,933 A * | 3/1994 | Chigira | ............ | 396/82 |
| 5,859,733 A * | 1/1999 | Miyano et al. | ............ | 359/824 |
| 7,653,295 B2 * | 1/2010 | Yumiki et al. | ............ | 396/55 |
| 7,697,828 B2 * | 4/2010 | Hu et al. | ............ | 396/79 |
| 7,920,420 B2 * | 4/2011 | Lee | ............ | 365/185.03 |
| 2006/0061891 A1 * | 3/2006 | Ito et al. | ............ | 359/824 |

FOREIGN PATENT DOCUMENTS

| | | |
|---|---|---|
| JP | 2005-148109 | 6/2005 |
| JP | 2007-86158 | 4/2007 |

* cited by examiner

*Primary Examiner* — James Hannett
(74) *Attorney, Agent, or Firm* — Cozen O'Connor (57) ABSTRACT

Provided is an imaging device which simplifies an assembling adjustment so as to reduce the manufacturing time and cost, wherein second lens L2 driven by actuator 30 is brought into contact with first lens L1 and third lens L3 so that a hyper-focal position or an infinite position as a reference focal position, and close-up position are accurately positioned, that is, it is possible to perform assembling without adjustment and effectively reduce the number of manufacturing steps.

9 Claims, 7 Drawing Sheets

IMAGING DEVICE

RELATED APPLICATIONS

This is a U.S. National Phase Application under 35 U.S.C. 371 of International Application PCT/JP2008/062686, filed on Jul. 14, 2008.

This application claims the priority of Japanese Application No. 2007-195682 filed on Jul. 27, 2007, the entire content of which is hereby incorporated by reference.

TECHNICAL FIELD

The present invention relates to an imaging device, employing a solid state imaging element, such as a CCD imaging sensor or a CMOS imaging sensor.

BACKGROUND OF THE INVENTION

In recent years, due to the high technical advantages of the imaging devices employing the solid state imaging element, such as CCD (Charged Coupled Device), or CMOS (Complementary Metal Oxide Semiconductor), cellular phones, employing an imaging device carrying an automatic focusing mechanism (hereinafter referred to as "AF mechanism"), have become widely used.

A lens driving device as a conventional example is disclosed in Patent Document 1, in which an actuator is arranged around a lens, and said lens is driven in an optical axial direction.

Patent Document 1: Unexamined Japanese Patent Application Publication Number 2007-86,158.

DISCLOSURE OF THE INVENTION

Problems to be Solved by the Invention

In the imaging device described in Patent Document 1, a focusing lens, to be driven in the optical axial direction by the actuator, is configured to move between a close-up position and a hyper-focal position, or between the close-up position and an infinite position, based on an electrical power to be applied to the actuator. According to said conventional technology, when an imaging lens system is to be assembled, the close-up position and the hyper-focal position, or the close-up position and the infinite position, must be correctively adjusted. Said positional adjustment must be conducted while variable electrical power is applied to the actuator, which results in a long adjusting time.

The present invention has been conducted to overcome the problem of the conventional technologies, and its object is to supply the imaging device exhibiting the reduction of the manufacturing time and cost.

Means to Solve the Problems

An imaging device of the present invention includes,
a housing, an imaging lens system, including a fixed lens and a movable lens, both arranged in the housing, an actuator to drive the movable lens in an optical axial direction, and an imaging element mounted on the housing, wherein a position, at which the movable lens comes into contact with the fixed lens, is determined to be a reference focal position of the imaging lens system.

Based on the present invention, since the position, at which the movable lens comes into contact with the fixed lens, is determined to be the reference focal position of the imaging lens system, the imaging system can be designed so as to make said position to be the hyper-focal position, the infinite position, or the close-up position, whereby an assembling work can be conducted without the adjustment, which effectively reduces the number of manufacturing steps.

Based on the specific embodiment of the present invention, the reference focal position represents the hyper-focal position or the infinite position.

Based on the specific embodiment of the present invention, the reference focal position represents the close-up position.

Based on the specific embodiment of the present invention, the reference focal position represents the hyper-focal position or the infinite position, and the close-up position.

Based on the specific embodiment of the present invention, the fixed lenses are mounted on both sides of the movable lens, in the moving direction of the movable lens.

Based on the specific embodiment of the present invention, the fixed lens is mounted on a single side of the movable lens, in the moving direction of the movable lens.

Based on the specific embodiment of the present invention, the imaging element is shielded from an external section by the imaging lens system and the housing.

Effect of the Invention

Based on the present invention, by the simplification of the assembling adjustment, it is possible to offer the image forming device, in which the manufacturing time and cost are reduced.

EXPLANATION OF THE ALPHA-NUMERICAL SYMBOLS 10 imaging lens
20 housing
30 actuator
31 fixing section
32 ring section
40 covering member
50, 50', 50", 50A, and 50B imaging devices
51 image sensor
51a photo-electrical conversion section 51b signal processing circuit
52 base
60 input section
70 display section
80 wireless communication section
92 memory section
100 cellular phone
101 control section
B adhesive
BT button
L1-L4 lenses
SM light shielding mask
AP diaphragm

DESCRIPTION OF THE PREFERRED EMBODIMENTS

Figure 1:
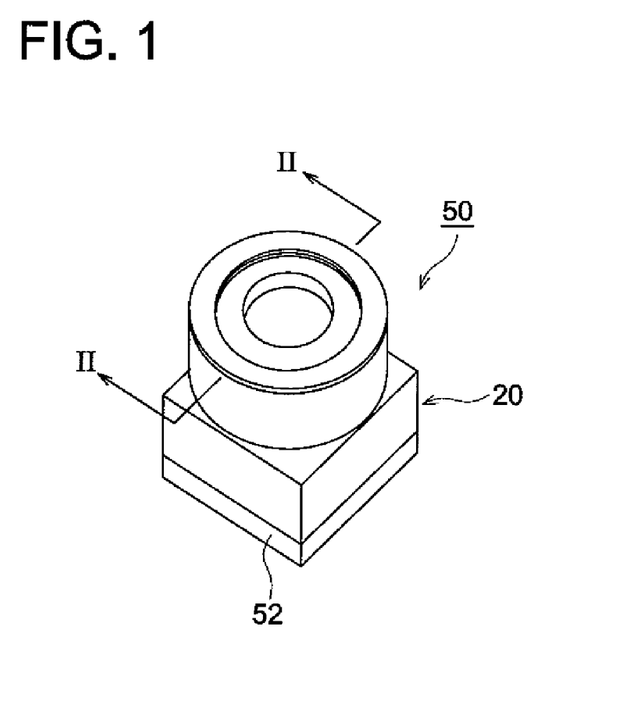
FIG. 1 is a perspective view of imaging device 50, relating to the present embodiment.
Figure 2A:
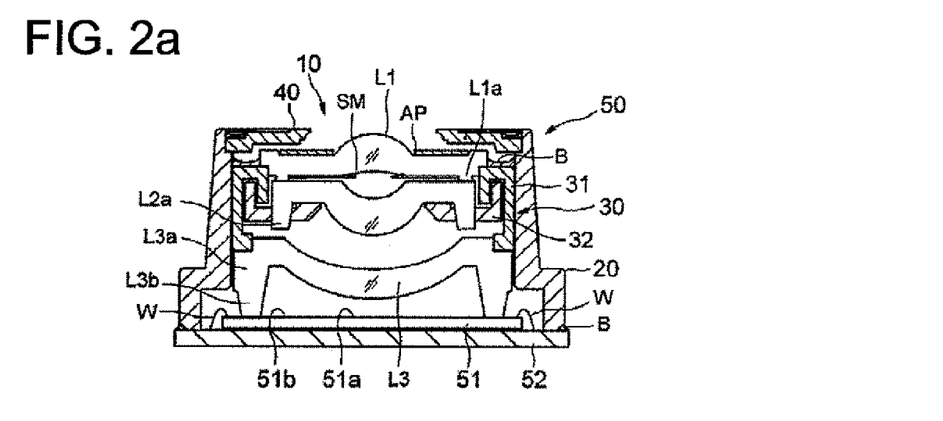
FIGS. 2a, 2b and 2c are cross sections taken along line II-II in FIG. 1, viewed in the arrowed direction.
Figure 2B:
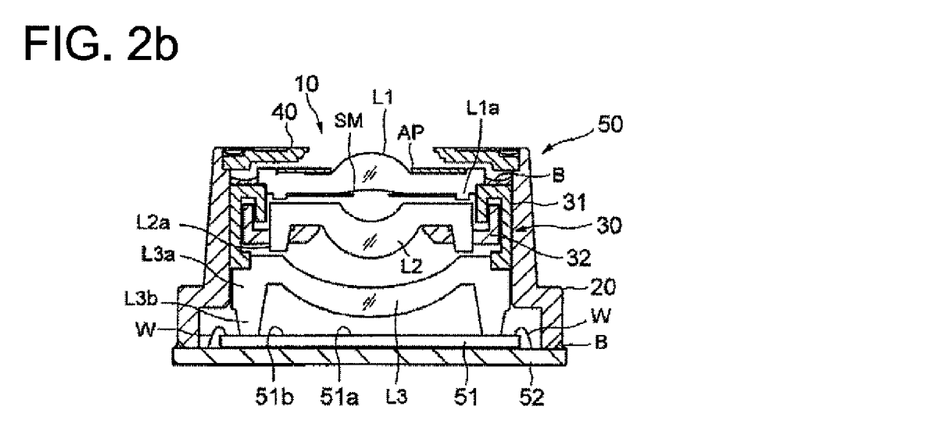
Figure 2C:
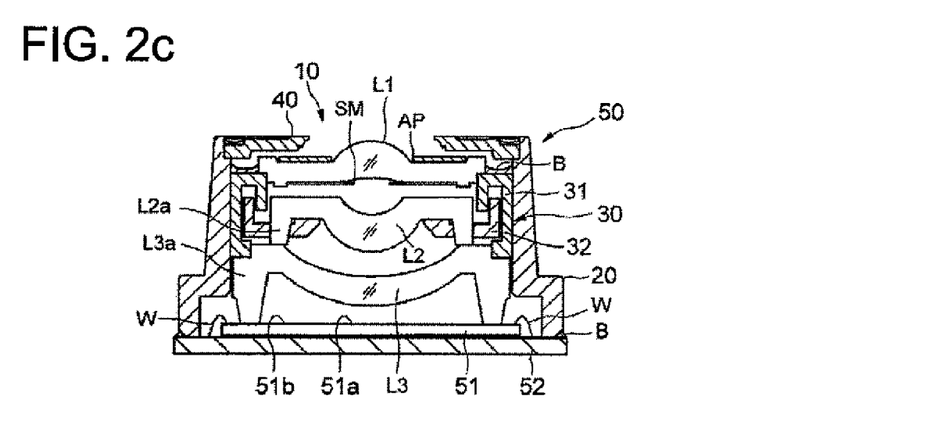
Figure 3:
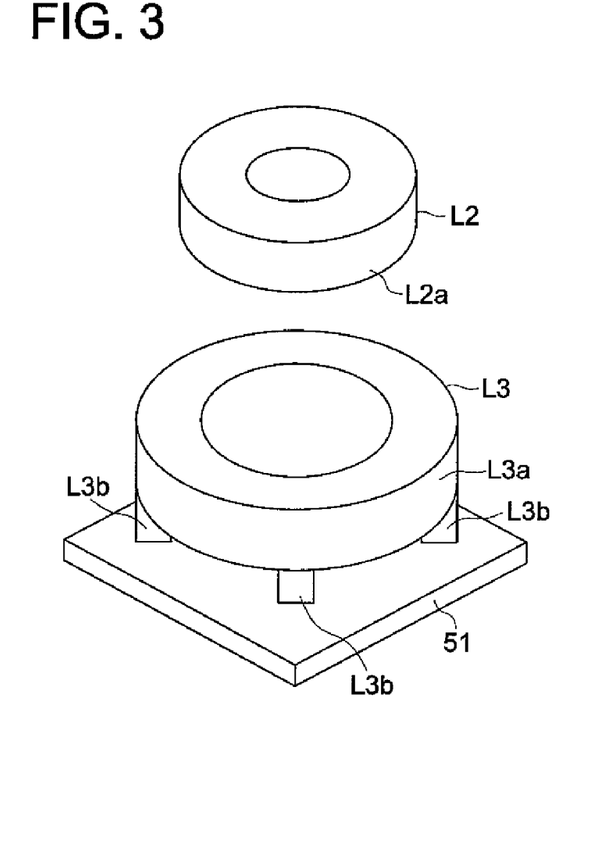
FIG. 3 is a perspective view showing a portion of a lens in the imaging lens system.

The embodiments of the present invention will now be detailed while referring to the drawings. FIG. 1 is a perspective view of imaging device 50 relating to the present embodiment. FIG. 2 is a cross sectional view, taken along line II-II of the structure shown in FIG. 1, viewed in the arrowed direction, wherein an imaging lens system shown in (a) exists in the close-up position, an imaging lens system shown in (b) exists in an intermediate position, and an imaging lens system shown in (c) exists in the hyper-focal position or an infinite position. FIG. 3 is the perspective view showing a portion of a lens in the imaging lens system. Imaging device 50 is integrally formed of:

CMOS-type image sensor 51, serving as a solid imaging element, including photo-electrical conversion section 51a;

imaging lens system 10, serving as an imaging lens to focus a photographic object onto photoelectric conversion section 51a of said image sensor 51;

circuit board 52, supporting image sensor 51, and having an external connecting terminal, being not illustrated, to send and receive its electrical signals;

housing 20 for including the imaging lens; and actuator 30 for driving imaging lens system 10.

Photoelectric conversion section 51a, serving as a light receiving section, is structured on the center of a surface of a light receiving side of imaging sensor 51, wherein picture elements (which are photo-electrical conversion elements) are arranged in a matrix on photoelectric conversion section 51a, and signal processing circuit 51b is formed around photoelectric conversion section 51a. Said signal processing circuit 51b is structured of:

a driving circuit section which sequentially drives each picture element, and obtains signal charges;

an A/D conversion section which converges each signal charge to the digital signal; and a signal processing section which uses the digital signal to form image signals.

Further, a plurality of pads (which are not illustrated) are arranged at portions adjacent to an exterior edge of the surface of the light receiving side of image sensor 51, and said pads are connected to circuit board 52 through wires W.

Still further, imaging sensor 51 converts the signal charges sent from photoelectric conversion section 51a to image signals, such as digital YUV signals, and outputs the image signals to predetermined circuits of circuit board 52 through wires W. In the above case, "Y" represents a brightness signal, "U (=R−Y)" represents a color-difference signal between red and the brightness signal, and "V (=B−Y)" represents a color-difference signal between blue and the brightness signal. In addition, the imaging element is not limited to the above described CMOS-type image sensor. Alternatively, the imaging element may be selected from other sensors, such as a CCD or the like.

Circuit board 52, mounted at the bottom of housing 20, includes a plurality of pads for transferring the signals, mounted on its surface, whereby said pads are connected to wires W, led from image sensor 51.

Circuit board 52 is connected to an external circuit (such as a control circuit, provided on a higher-level device having an imaging device), through external connecting terminals, whereby circuit board 51 can receive electrical voltages and clock signals for driving image sensor 51 from the external circuit, or output digital YUV signals to the external circuits.

Housing 20, structured of the light shielding member, is a hollow tube, which is arranged to surround image sensor 51, and has circuit board 52, adhered to the bottom of housing 20.

Actuator 30 is configured to fit the interior circumference of housing 20 to be adhered by adhesive B, and includes cylindrical fixing section 31 including a coil and a yoke, and ring section 32 including a magnet and being movable within fixing section 31.

On the center of housing 20, first lens L1, second lens L2, and third lens L3 are arranged in this order from the photographic subject. First lens L1 comprises a first lens section L11 and a flange section L1a, second lens L2 comprises a second lens section L21 and a flange section L2a and third lens L3 comprises a third lens section L31 and a flange section L3a. Flange section L1a includes contacting section L1a1, flange section L2a includes plural contacting sections L2a1 and L2a2 and flange section L3a includes contacting section L3a1. An infrared ray cutting layer is preferably coated on the surface of third lens L3. As shown in FIG. 3, third lens L3 incorporates four leg sections L3b, each protruding from the bottom of flange section L3a, to come into contact with the upper surface of image sensor 51, whereby the optical axial position of third lens L3 is precisely set on image sensor 51. Further, in FIG. 2, the upper exterior circumference of flange section 3a of third lens L3 is configured to fit the lower interior circumference of fixing section 31 of actuator 30, so that third lens L3 is precisely fixed onto housing 20, with respect to the optical axial direction, and with respect to a direction perpendicular to the optical axial direction.

Flange section L2a of second lens L2, supported by ring section 32 of actuator 31, and integrally moved with ring section 32 of actuator 31, incorporates three or four leg sections, protruding downward to penetrate ring section 32. Flange section L1a of first lens L1 is configured to fit the upper interior circumference of fixing section 31 of actuator 30, and is pushed to adhere the upper surface with adhesive B (a member to fix fixing section 31 onto housing 20 may be preferably and commonly used). Accordingly, through housing 20, first lens L1 is precisely directed to image sensor 51, with respect to the optical axial direction, and with respect to a direction perpendicular to the optical axial direction. Still further, first lens L1 and third lens L3 can be precisely positioned, with respect to the optical axial direction, without any typical adjustment, through fixing section 31. In the present embodiment, image sensor 51 is enclosed by housing 20 and imaging lens system 10, so that no foreign material can enter the imaging system from the exterior. Still further, both first lens L1 and third lens L3 represent fixed lenses, while second lens L2 represents a movable lens.

Further, since light-shielding mask SM is provided between first lens L1 and second lens L2, unnecessary light rays are prevented from entering the outer side of an effective diameter of lens, in adjacent to the solid imaging element, so that light-shielding member SM prevents ghosting or flaring.

Still further, diaphragm plate AP, having an aperture, is adhered to the upper surface of first lens L1, and covering member 40 is provided on an upper end of housing 20.

Based on the present embodiment, the optical axial positions of image sensor 51 and third lens L3 are accurately determined by leg sections L3b of third lens L3, serving as the fixed lens, because leg sections L3b are formed to come into contact with the upper surface of image sensor 51. On the other hand, the optical axial positions of first lens L1 and third lens L3 are accurately determined by fixing section 31 of actuator 30, because fixing section 31 is formed to exist between first lens L1 and third lens L3. Further, when ring section 32 is shifted to the nearest side of the image by actuator 30, flange section L2a of second lens L2 comes into contact with the upper end of third lens L3 ((FIG. 2(c)). In this condition, the focal position of imaging lens system 10 is designed to be a hyper-focal position or an infinite position. On the other hand, when ring section 32 is shifted to the nearest side of the object by actuator 30, the upper end of second lens L2 comes into contact with flange section L1a ((FIG. 2(a)). In this condition, the focal position of imaging lens system 10 is designed to be a close-up position.

Figure 8:
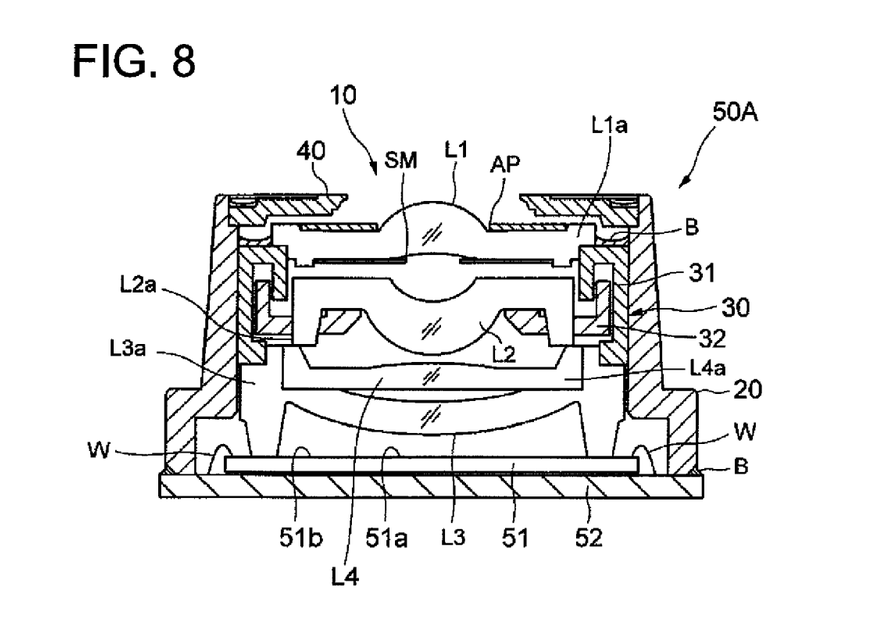
FIG. 8 is a cross sectional view of imaging device 50A relating to still another embodiment, shown in the same way as in FIGS. 2a, 2b and 2c.

Based on the present embodiment, since second lens L2, driven by actuator 30, comes into contact with first lens L1 and third lens L3, the hyper-focal position or the infinite position, serving as the reference focal position, and the close-up position, are accurately positioned. Thus, it is possible to perform assembling without adjustment, and effectively reduce the number of manufacturing steps. In the above embodiment, the imaging lens is structured of three lenses, but which is not a limited number. For example, as a variation shown in FIG. 8, fourth lens L4, being coupled with third lens L3, is provided between second lens L2 and third lens L3, so that the imaging system is structured of four lenses, (in this case, lenses L3 and L4 structure a lens group serving as a fixed lens), and more than four lenses may be used as the imaging system. Further, in a variation shown in FIG. 8, the lower surface of flange section L2a of second lens L2 is configured to come into contact with the upper surface of flange section L4a of fourth lens L4. However, our invention is not limited to this structure, that is, the lower surface of flange section L2a of second lens L2 may be configured to come into contact with the upper surface of flange section L3a of third lens L3.

Figure 4A:
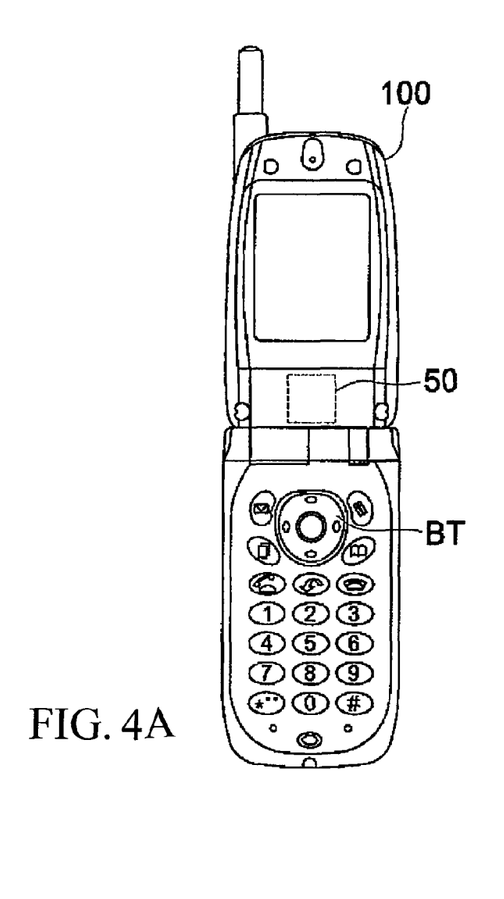
FIGS. 4a and 4b show cellular phone 100 incorporating imaging device 50 as a cellular terminal.
Figure 4B:
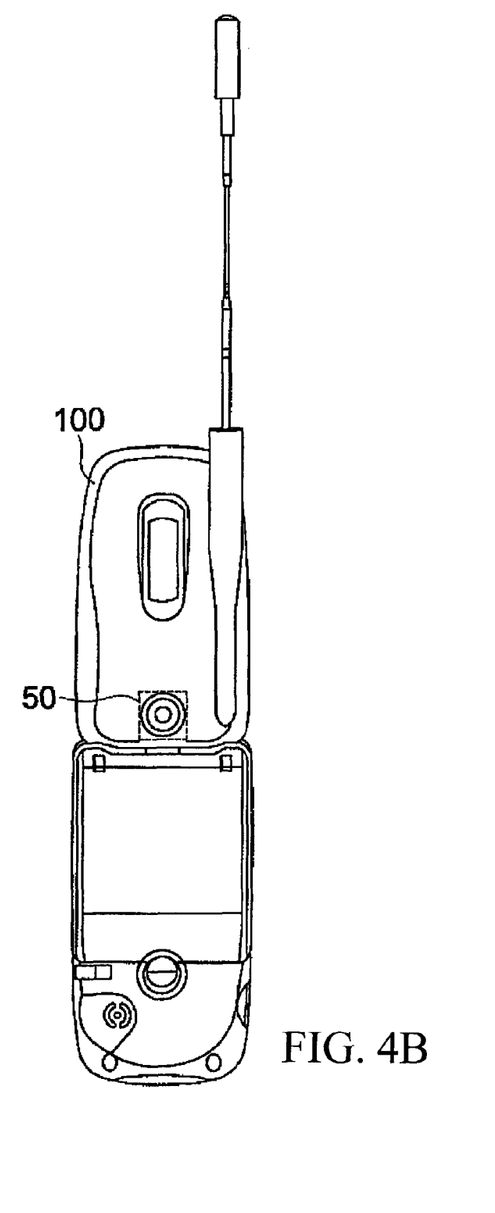
Figure 5:
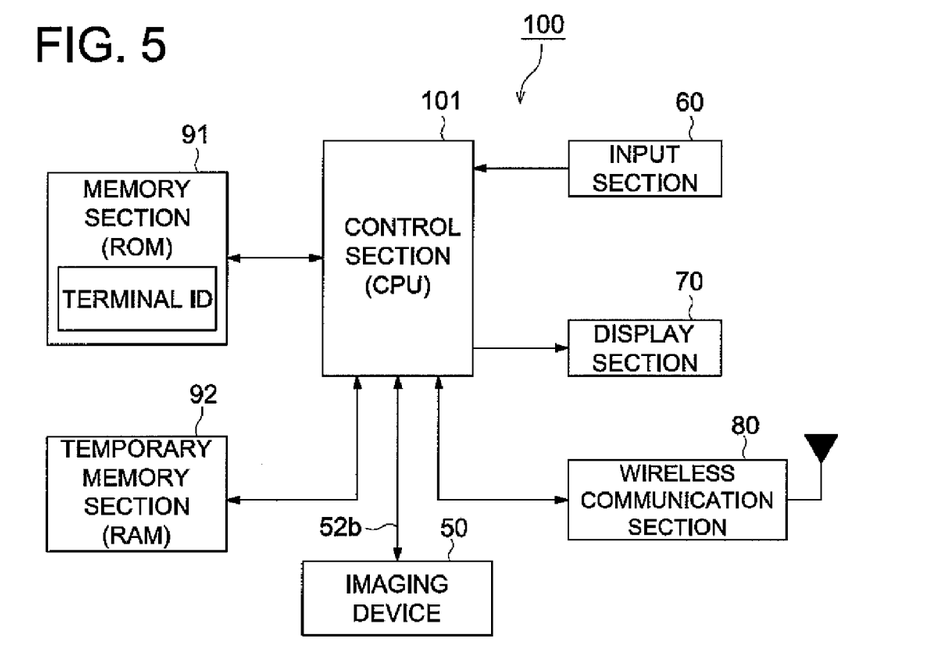
FIG. 5 is a block diagram showing control of cellular phone 100.

How to use imaging device 50 will be detailed below. FIG. 4 shows imaging system 50, which is mounted on cellular phone 100, serving as a handy terminal device. FIG. 5 shows a block diagram of cellular phone 100.

Imaging device 50 is mounted on cellular phone 100, in such a way that the object side of housing 20 of the imaging lens is on the back surface of cellular phone 100.

An external connection terminal (which is not illustrated) of imaging device 50 is connected to control section 101 of cellular phone 100, and outputs the image signals, such as luminance signals and color-difference signals, to control section 101.

As shown in FIG. 5, cellular phone 100 includes:
control section (being CPU) which totally controls each section, and carries out programs based on each process, input section 60 through which the numerals are indicated to be inputted by a ten-key section, display section 70 which displays predetermined data, and photographed images, wireless communication section 80 which conducts various information communications with external servers, memory section (being ROM) 90 which memorizes system programs and various processing programs of cellular phone 100, and various necessary data, such as terminal IDs, and temporary memory section (being RAM) 92, being used as a working area, in which various processing programs and data or processing data are executed by control section 101, and said memory section 92 temporarily stores the image data obtained by imaging device 50.

When the photographer aims the optical axis of imaging lens system 10 of imaging device 50 at an object to take a photo of the object, an image signal is taken in image sensor 51, and a de-focused image is detected by an image-field automatic focusing process. Actuator 30 is then activated by the electric power, supplied by an instruction of control section 101, and actuator 30 drives second lens L2 to improve the de-focused images, whereby said second lens L2 and ring section 32 are driven to an optimal focusing position to be retained ((FIG. 2(b)), so that an appropriate automatic focusing operation is actually conducted. If a manual mode is provided in said cellular phone, and when the photographer operates a switch, which is not illustrated, to select the close-up position, actuator 30 is activated to drive second lens L2 to contact with the first lens as shown in FIG. 2(a), and when the photographer operates said switch to select the hyper-focal position or the infinite position, actuator 30 is activated to drive second lens L2 to contact with the third lens as shown in FIG. 2(c), whereby the photographing operation can be quickly conducted.

At the desired shutter chance, the photographer pushes button BT so that a shutter is released, and the image signal is taken in imaging device 50. The image signal, sent from imaging device 50, is sent to the control system of cellular phone 100, to be stored in memory section 92, or to be displayed on display signal 70, and is sent to the external sections through wireless communication section 80.

Figure 6:
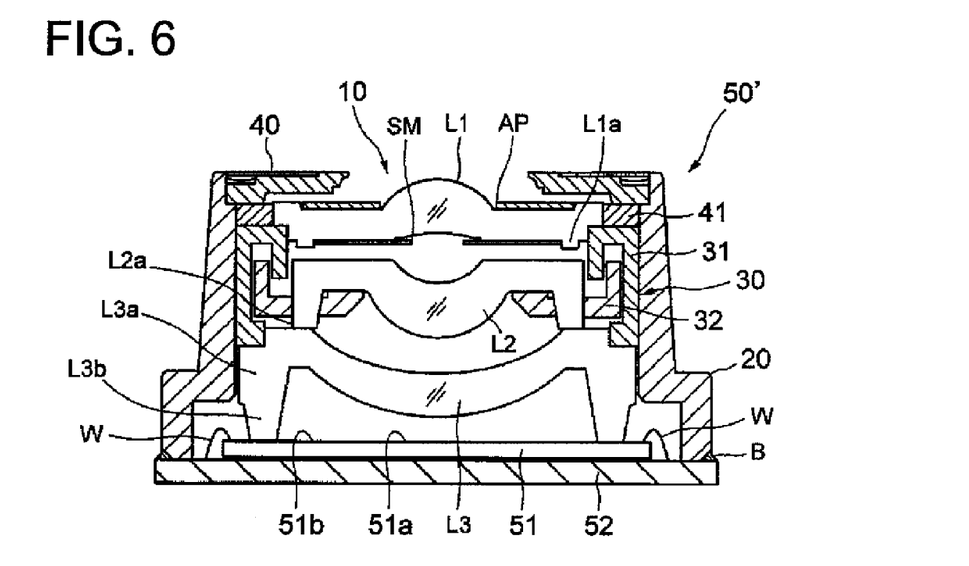
FIG. 6 is a cross sectional view of imaging device 50' relating to another embodiment, shown in the same way as in FIGS. 2a, 2b and 2c.

FIG. 6 is a cross sectional view of imaging device 50' relating to another embodiment, shown in the same way as FIG. 2. In the above embodiment, fixing section 31 of actuator 30 is adhered onto housing 20, instead, in the present embodiment, elastic member 41 is provided between fixing section 31 and covering member 40, wherein said covering member 40 is fixed to housing 20, whereby third lens L3 is pushed toward image sensor 51 by the elastic force of elastic member 41 through fixing member 31, being different from the structure of the above detailed embodiment. The explanation of the present embodiment other than the above explanation are the same as the explanations of the above detailed embodiment, so that those are omitted.

Figure 7A:
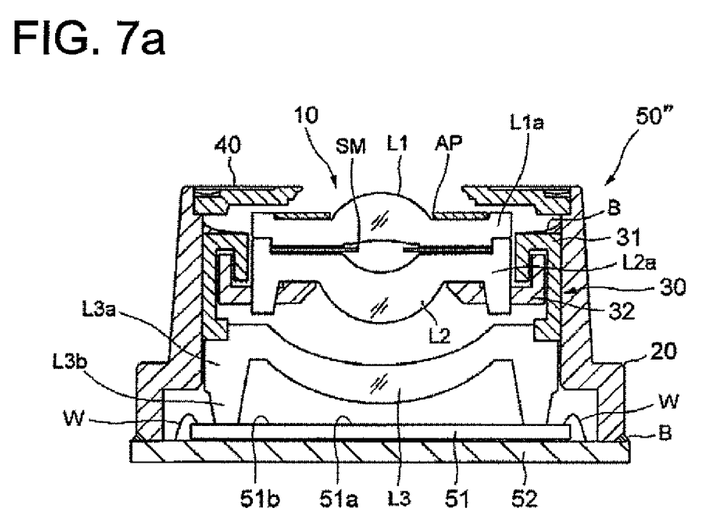
FIGS. 7a and 7b are cross sectional views of imaging device 50" relating to still another embodiment, shown in the same way as in FIGS. 2a, 2b and 2c.
Figure 7B:
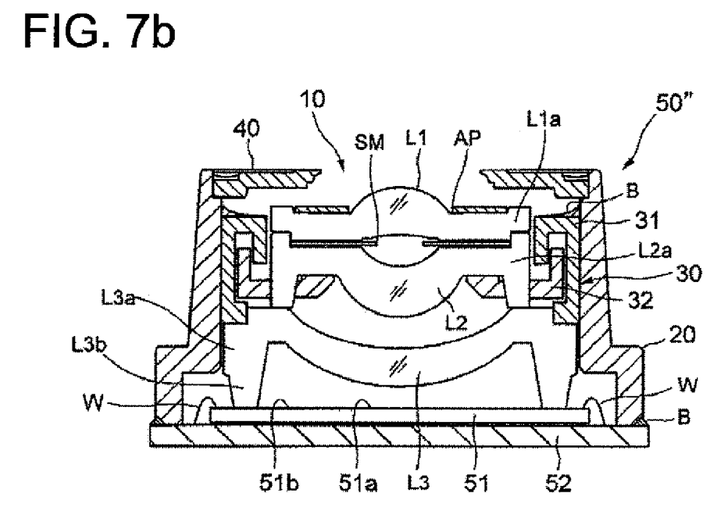

FIG. 7 is a cross sectional view of imaging device 50" relating to still another embodiment, shown in the same way as FIG. 2. The imaging system shown in (a) exists in the close-up position, while the imaging system shown in (2) exists in the hyper-focal position or the infinite position. In the present embodiment, since flange sections L1a and L2a are coupled to each other so that the optical axes of first lens L1 and second lens L2 are brought on line, and said flange sections are supported by ring section 32 of actuator 30, whereby said first and second lenses can be integrally moved in the optical axial direction, which differs from the structure of the above embodiment. In the present embodiment, third lens L3 structures the fixed lens, while first lens L1 and second lens L2 structure the movable lenses.

In the above structure, when ring section 32 is moved to the nearest side of the image by actuator 30, flange section L2a of second lens L2 comes into contact with the upper end of third lens L3, whereby the hyper-focal position or the infinite position can be determined as the reference focal position by the above method, however, the determination of the close-up position is problematic. In the present embodiment, during the assembling work, both electrical current value and voltage, applied to a coil of actuator 30, are memorized, wherein said current value and voltage allow the optical axial positions of first lens L1 and second lens L2, to exhibit the close-up position of imaging lens system 10. Accordingly, when the focusing operation is conducted, the close-up position of imaging lens system 10 can be determined, based on the above memorized current value and voltage. Thus, in this embodiment, the reference focal position can be adjusted by a single operation, which reduces the number of manufacturing steps of the imaging device.

Figure 9:
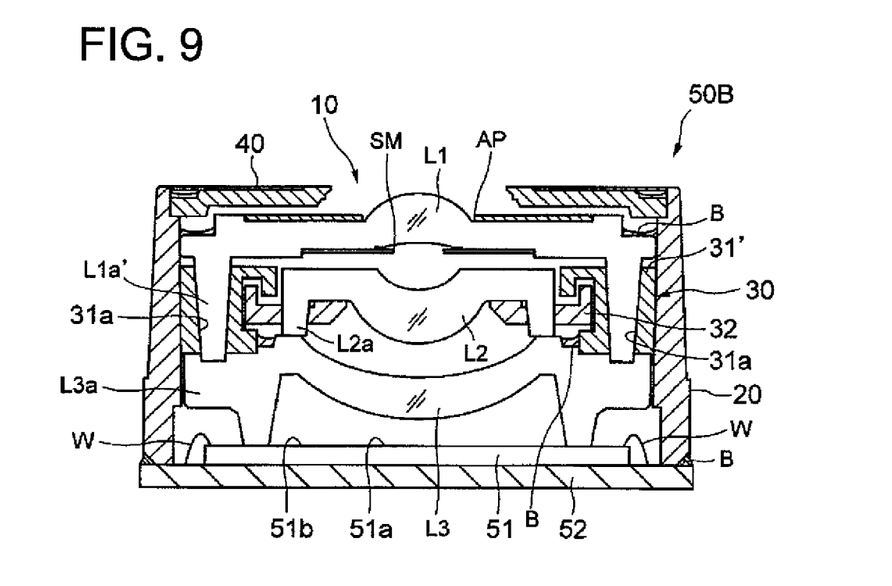
FIG. 9 is a cross sectional view of imaging device 50B relating to still another embodiment, shown in the same way as in FIGS. 2a, 2b and 2c.

FIG. 9 is a cross sectional view of imaging device 50B, relating to still another variation, shown in the same way as FIG. 2. Fixing section 31' of actuator 30 includes three or four through-holes 31a, penetrating fixing section 31' in the optical axial direction. Holes 31a exhibit a tapered shape, becoming narrower as it goes down. On the other hand, flange section L1a' of first lens L1 includes three or four tapered feet protruding downward, which are inserted in through-holes 31a, so that the tops of tapered feet are projected from the bottom of fixing section 31'. In the present variation, the tops of flange section L1a' of first lens L1 directly comes into contact with the top surface of flange section L3a of third lens L3, whereby first lens L1 and third lens L3 are accurately positioned in the optical axial direction with no adjustment. The explanations of the present embodiment other than the above explanation are the same as the explanations of the above detailed embodiment, so that those are omitted.

The present invention has been detailed while referring to the embodiments. Since the present invention is not limited to the above embodiments, the present invention can be, of course, appropriately changed or improved.

The invention claimed is:

1. An imaging device, comprising:
a housing section;
an actuator;
a base section mounted at a bottom of the housing section;
an imaging element mounted on the base section; and
an imaging lens system, including:
  a first lens which is arranged in the housing section, wherein the first lens integrally includes:
    a first lens section, and
    a first lens flange section including a contacting surface;
  a second lens which is movably arranged in the housing section, wherein the second lens integrally includes:
    a second lens section, and
    a second lens flange section including plural contacting surfaces; and
  a third lens which is arranged in the housing section, wherein the third lens integrally includes:
    a third lens section,
    a third lens flange section including a contacting surface, and
    a leg section which is arranged on the imaging element,
wherein the first lens, the second lens and the third lens have a common optical axis,
wherein the first lens and the third lens are positioned in the housing section to keep a predetermined distance between each other,
wherein the second lens is moved by the actuator in an optical axial direction,
wherein the third lens is mounted on the imaging element, and
wherein when the contacting surface of the second lens comes into contact with the first lens flange section or the third lens flange section, a position of the second lens in the optical axial direction comprises a reference focal position.

2. The imaging device of claim 1, wherein the reference focal position represents a hyper-focal position or an infinite position.

3. The imaging device of claim 1, wherein the reference focal position represents a close-up position.

4. The imaging device of claim 1, wherein the reference focal position represents a hyper-focal position or an infinite position, and a close-up position.

5. The imaging device of claim 1, wherein the first lens and the third lens are mounted to sandwich the second lens, in a moving direction of the second lens.

6. The imaging device of claim 1, wherein the third lens is a fixed lens mounted on a single side of the first lens and the second lens, which comprise a movable lens, in the moving direction of the movable lens.

7. The imaging device of claim 1, wherein the imaging element is shielded from an external section by the imaging lens system and the housing.

8. The imaging device of claim 1, wherein the contacting surface of the first lens flange section includes a protruding contacting section.

9. The imaging device of claim 1, wherein the plural contacting surfaces of the second lens include a protruding contacting section and a flat contacting section.

* * * * *